Oct. 7, 1969　　　W. W. BARNEY　　　3,471,862
ENCODER APPARATUS FOR MAGNETIC CREDIT CARDS AND THE LIKE
Filed Oct. 18, 1967　　　　　　　　　　　　　　　7 Sheets-Sheet 1

INVENTOR.
WALTER W. BARNEY
BY Jerry E. Turner
ATTORNEY

Oct. 7, 1969                W. W. BARNEY                3,471,862
          ENCODER APPARATUS FOR MAGNETIC CREDIT CARDS AND THE LIKE
Filed Oct. 18, 1967                                7 Sheets-Sheet 2
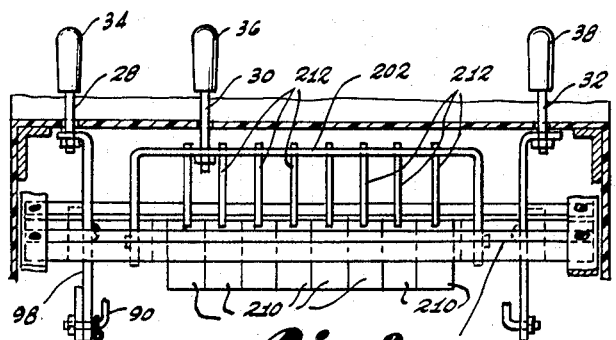
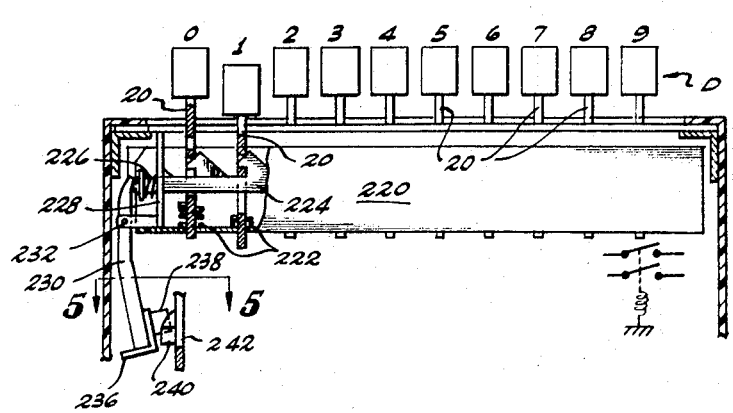
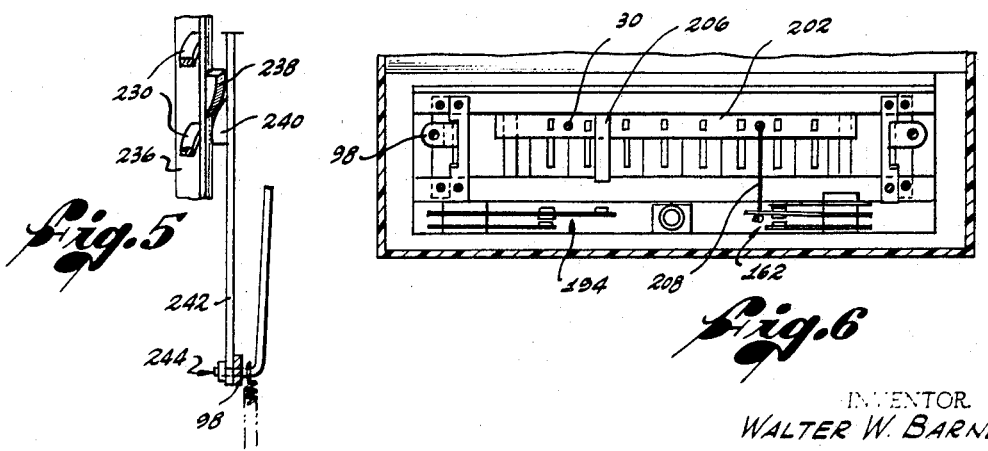
INVENTOR.
WALTER W. BARNEY
BY *Jerry E. Turner*
ATTORNEY

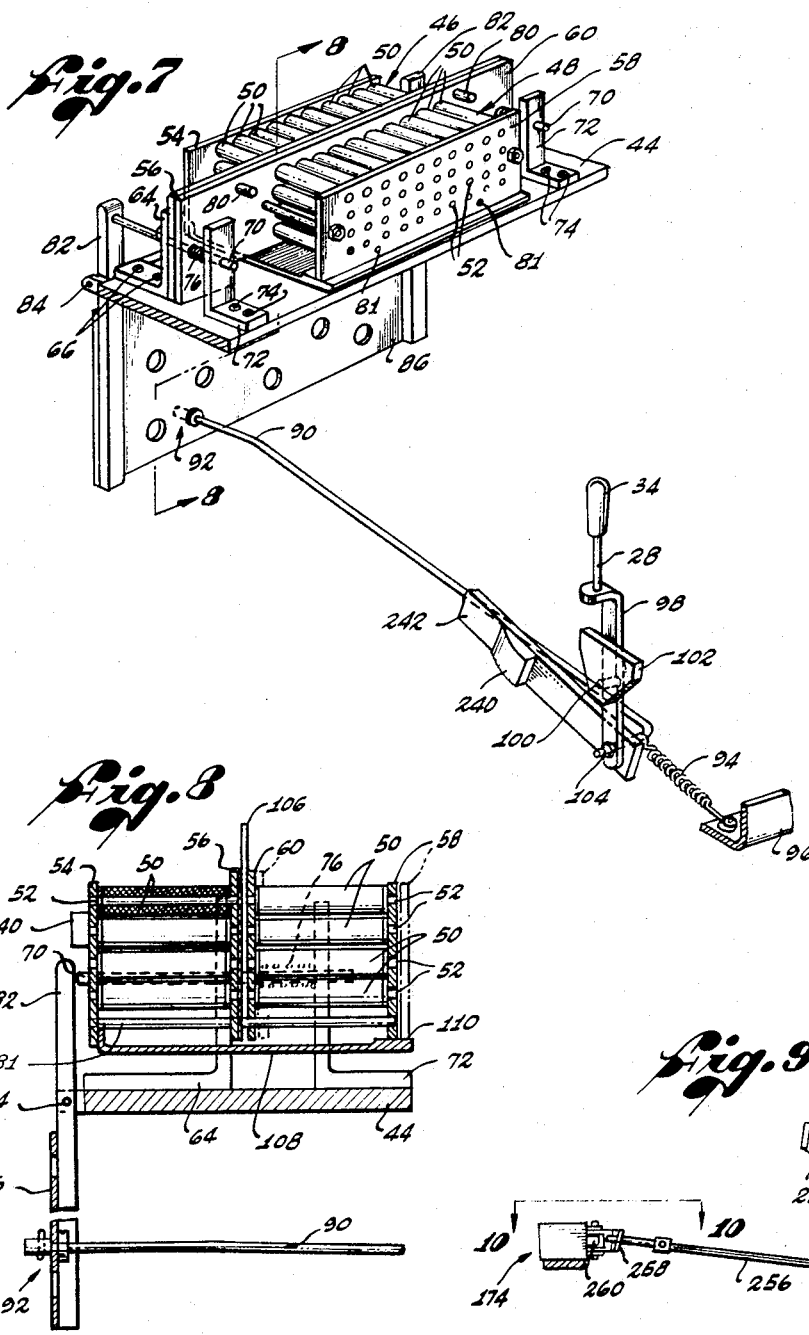

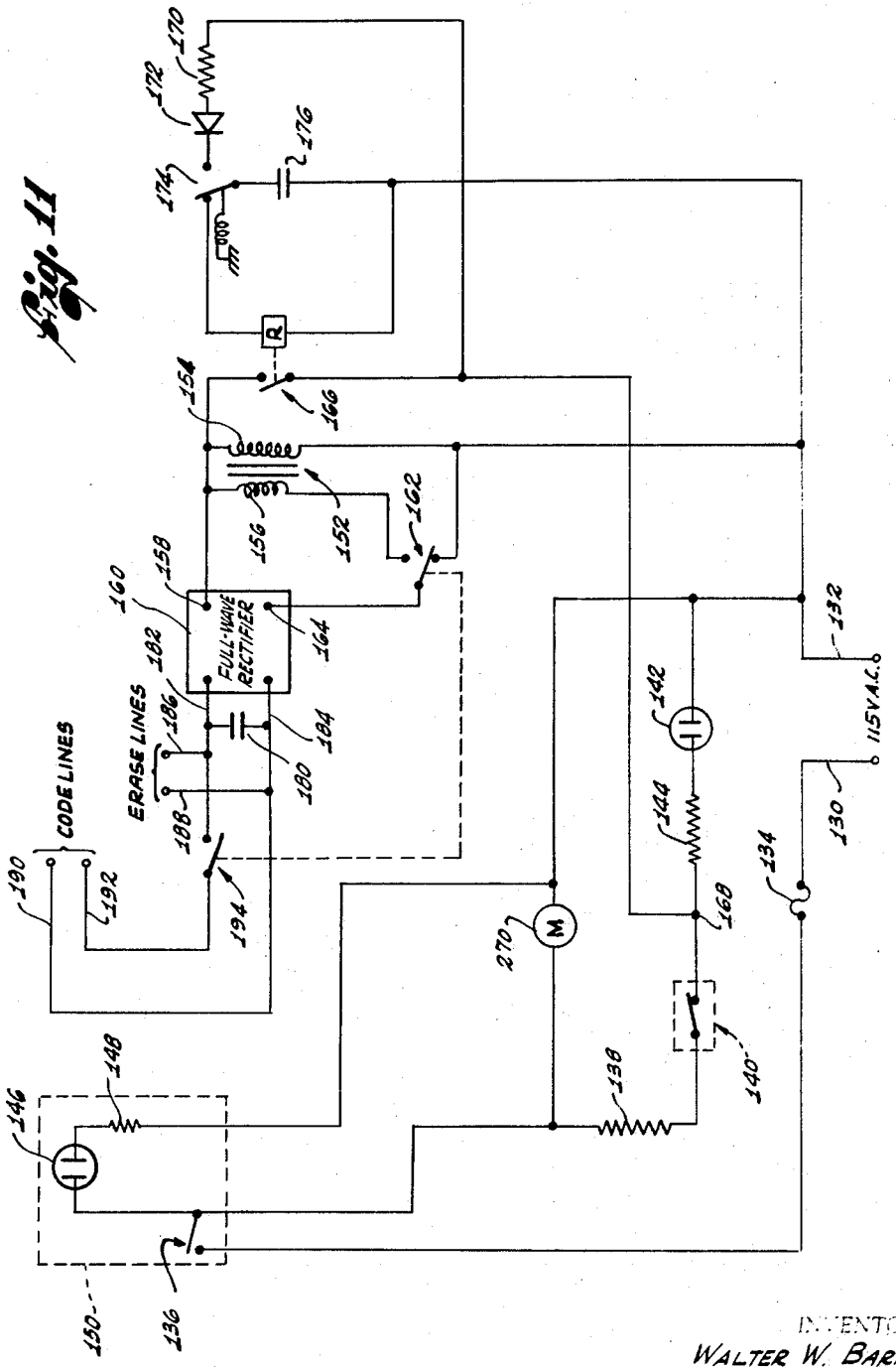

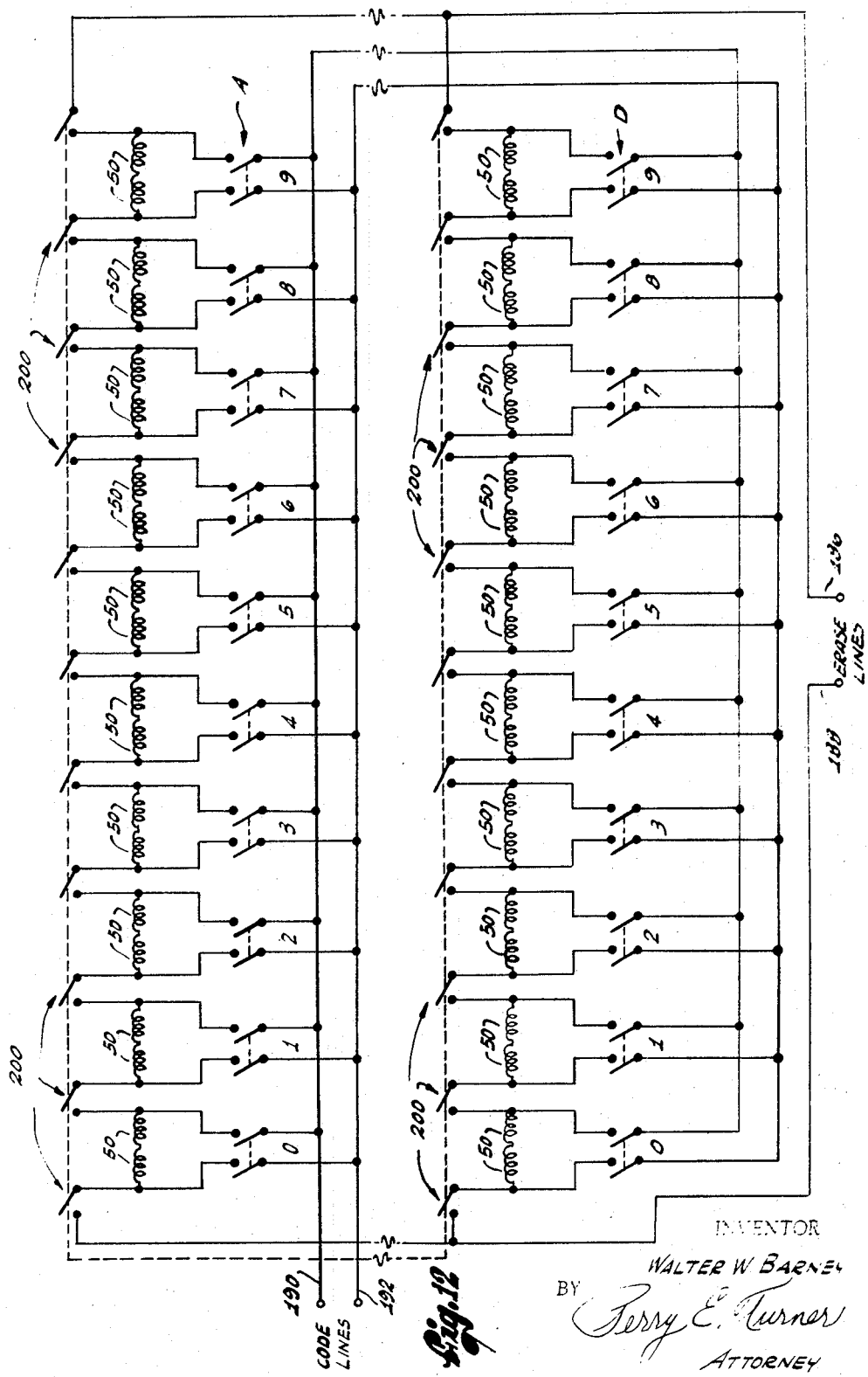

Oct. 7, 1969 W. W. BARNEY 3,471,862
ENCODER APPARATUS FOR MAGNETIC CREDIT CARDS AND THE LIKE
Filed Oct. 18, 1967 7 Sheets-Sheet 7
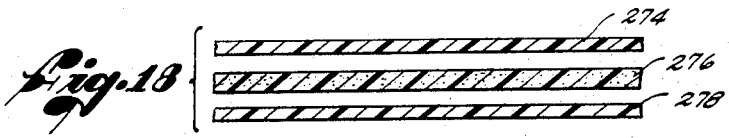
Fig. 18
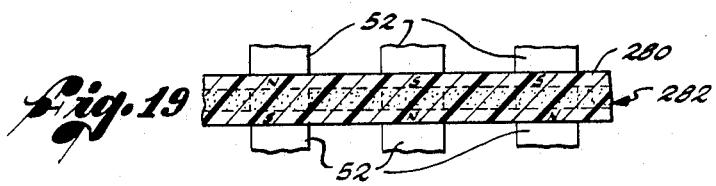
Fig. 19
Fig. 20
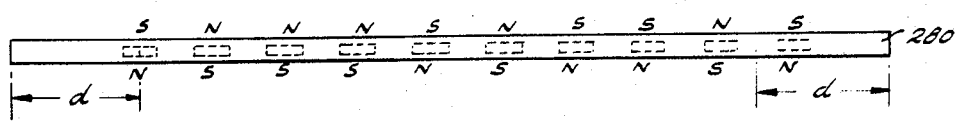
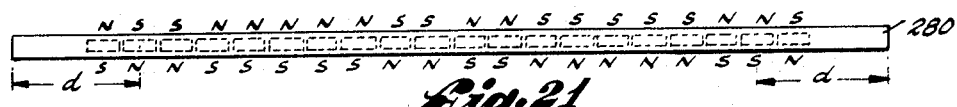
Fig. 21
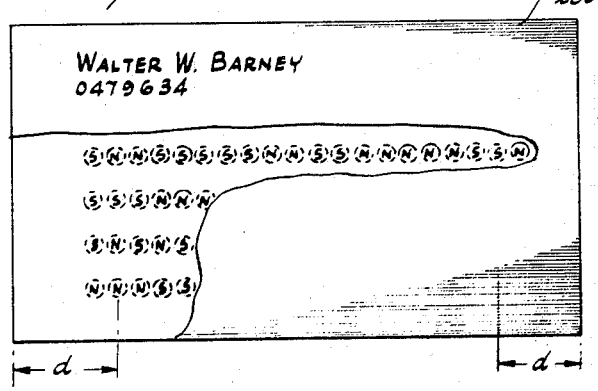
Fig. 22
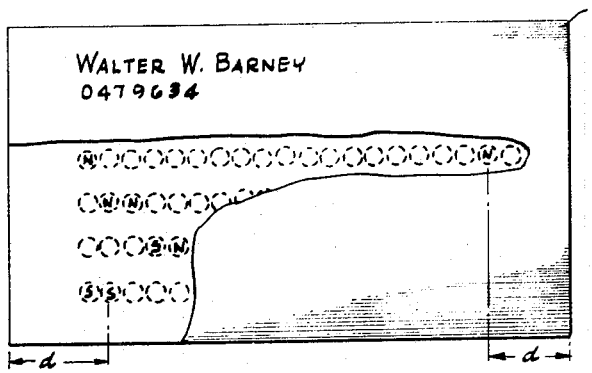
Fig. 23
INVENTOR.
WALTER W. BARNEY
BY Perry E. Turner
ATTORNEY United States Patent Office 3,471,862
Patented Oct. 7, 1969

3,471,862
ENCODER APPARATUS FOR MAGNETIC CREDIT CARDS AND THE LIKE
Walter W. Barney, 4720 Rubio Ave., Encino, Calif. 91316
Filed Oct. 18, 1967, Ser. No. 676,138
Int. Cl. G01d 15/12
U.S. Cl. 346—74                      23 Claims

ABSTRACT OF THE DISCLOSURE

A card having magnetizable material embedded therein is inserted between rows of cores of coaxial electromagnets supported between two magnetic plates. A control circuit incorporating mode control switches and pushbutton switches is operated to energize all electromagnets and permanently magnetize all portions located between them along lines perpendicular to the surfaces of the card. Via pushbutton switches, the control circuit operates certain electromagnets to reverse polarities of selected permanent magnet portions, thereby coding the card. Levers condition the control circuit for each mode of electromagnet operation, and for supporting a card and simultaneously releasing a card and pushbuttons operated for coding purposes.

BACKGROUND OF THE INVENTION

Field of the invention

This invention relates to magnetic cards and means for magnetizing them.

Description of the prior art

The prior art (as U.S. Patent No. 3,154,761) discloses the use of a plurality of electromagnets in noncoaxial pairs to be positioned adjacent the opposite ends of elongated strip magnets embedded in an opaque card. Each pair is energized under control of an individual switch to reverse the polarities of the magnets. The surfaces of the magnets are parallel to the card surfaces, and are magnetized in directions parallel to such surfaces. The various pairs of electromagnets cannot be simultaneously energized without setting up interfering fields, and the fields of strip magnets in the card inherently are in interfering relation. Because of such limitations, apparatus heretofore known has not been capable of high volume processing and coding of magnetic cards. Also, the number of magnets in such cards has had to be severely limited, whereby the card is incapable of satisfying the need for a card with a capacity for millions of codes which could serve as a credit card to be furnished to millions of customers.

Until my present invention, there was no way known to automatically permanently magnetize a plurality of hidden, previously unmagnetized portions in a card, along parallel lines perpendicular to the card surfaces, in conformance with a master pattern, and to automatically selectively reverse the polarities of a number of scattered portions to code the card.

SUMMARY OF THE INVENTION

My invention embraces a card that is made with unmagnetized material embedded therein, and which has a capacity for millions of different codes. Included also are means for initially magnetizing a plurality of portions of the magnetic material from electromagnets in such a manner that the fields of the electromagnets are not in interfering relation, and the fields of adjacent magnetized portions in the card are not in interfering relation. Encoder apparatus of my invention is simple to operate, and facilitates high volume processing of coded cards.

BRIEF DESCRIPTION OF THE DRAWINGS

FIG. 3 is a sectional view taken along the line 3—3 of FIG. 2, showing the switch operating mechanism to be placed in respective positions for magnetizing and coding a card as above mentioned;

FIG. 4 is a fragmentary sectional view taken along the line 4—4 of FIG. 1, showing the pushbutton switch construction and releasing means therefore;

FIG. 5 is a sectional view taken along the line 5—5 of FIG. 4, showing the cam arrangement for operating the pushbutton release mechanism;

FIG. 6 is a top plan view taken along the line 6—6 of FIG. 2, showing the arrangement of switches to be operated for conditioning the apparatus of FIG. 1 for magnetizing and coding cards as above mentioned;

FIG. 7 is a perspective view of coil arrangement of my invention forming electromagnets for simultaneously magnetizing spaced portions of a card of magnetic material, and showing the arrangement of parts for the card release mechanism;

FIG. 8 is a sectional view taken along the line 8—8 of FIG. 7;

FIG. 9 is a side elevation view of the coil energizing control switch and actuating means therefor, taken along the line 9—9 of FIG. 1;

FIG. 10 is a top plan view of the coil energizing control switch taken along the line 10—10 of FIG. 9;

FIG. 11 is a schematic diagram of a circuit in accordance with my invention for selectively applying energizing current to all or selected ones of the coils of FIG. 7;

FIG. 12 is a schematic diagram of a circuit in accordance with my invention incorporating the coils of FIG. 7, switches operated by the pushbuttons of FIGS. 1 and 4, and the switches of FIGS. 3 and 6;

FIG. 18 is a fragmentary sectional view of three plastic layers for forming a card of my invention, wherein the center layer is a sheet of homogeneous material adapted to be magnetized;

FIG. 19 is a fragmentary sectional view of a monolithic card made of the layers of FIG. 17, showing the cores of adjacent pairs of coils positioned for axially magnetizing circular portions of the center region of the card therebetween;

FIG. 20 is an edge view of a card made as indicated in FIG. 18, showing a row of discrete, axially magnetized areas which are formed upon placing the card in one position between aligned cores of one row of electromagnets;

FIG. 21 is an edge view of the card of FIG. 19 after it has been reversed in position between the same electromagnets, so as to axially magnetize additional areas;

FIG. 22 is a fragmentary plan view of one face of the card of FIG. 21, illustrating the polarities at that face resulting from magnetizing discrete portions on each side; and FIG. 23 is a fragmentary plan view like FIG. 21, wherein the polarities of four discrete portions of each master pattern are reversed to provide two codes.

DESCRIPTION OF PREFERRED EMBODIMENTS

Figure 1:
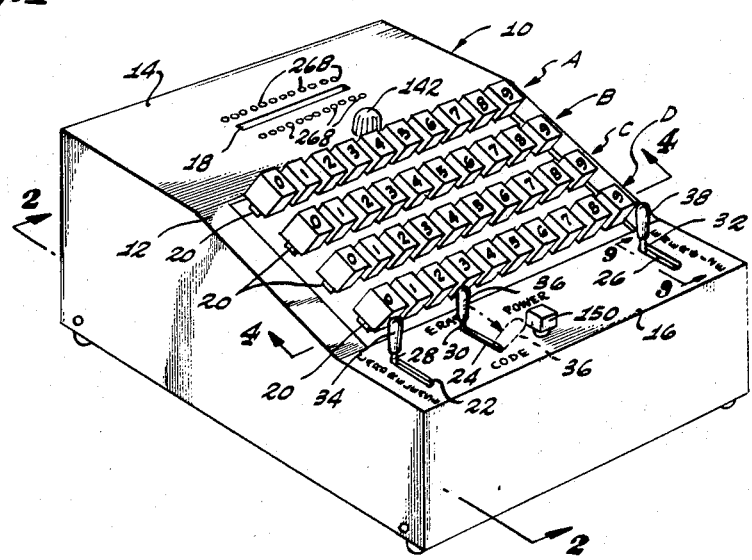
FIG. 1 is a perspective view of encoder apparatus of my invention for selectively magnetizing discrete portions of a magnetizable card in accordance with a predetermined master pattern, and for selectively reversing the polarities of certain portions to code the card.

Referring to FIG. 1, card encoding apparatus in accordance with my invention has a housing 10 which, in the arrangement shown, has a top wall formed of an inclined surface 12 intermediate upper and lower horizontal surfaces 14, 16. The upper surface 14 includes an elongated slot 18 into which to insert a card to be magnetized. The housing supports four rows of pushbuttons A, B, C, D, in which each pushbutton is mounted on the upper end of a plunger 20. In this example, in each row are ten pushbuttons numbered 0, 1, 2 . . . 9.

In the lower surface 16 are spaced slots 22, 24, 26, through which extend the upper ends of levers 28, 30, 32 having respective knobs 34, 36, 38, thereon. With reference to the front end of the housing shown in FIG. 1, the levers 28, 32 are normally biased towards the rear ends of their slots 22, 26. To insert a card in the slot 18, knob 34 is pulled to move its lever 28 forward. As will be explained hereafter with reference to FIGS. 7 and 8, such action separates a pair of plates normally biased together below the slot 18, and permits a card to be inserted in the slot and lowered between the plates. The knob 34 is then released, thereby releasing the lever 28 for return movement toward the rear of its slot 22, whereupon the card is sandwiched between the above-mentioned plates.

The lever 30 is adapted to be positioned at either end of its slot 24, and to remain in either position to which it is moved. As shown, its rear position is designated "erase" and its forward position is designated "code." With the lever 30 in the "erase" position, the lever 32 is momentarily actuated, by pulling the knob 38 forward and then releasing it, to energize a plurality of electromagnets (to be described hereafter) positioned on opposite faces of the card in the slot 18. If magnetic material in the card has not been magnetized, this operation causes discrete portions of the card to be magnetized, in accordance with a predetermined pattern, along lines perpendicular to the plane surfaces of the card. If the magnetic material in the card has previously been magnetized and coder, this operation reverses the polarities of the coded portions, i.e., erases the code.

To code such a card, the knob 36 is moved forward to position the lever 30 at the front end of the slot 24. Then a pushbutton in each of the rows A, B, C, D is pressed down, and the lever 32 is again momentarily actuated by pulling its knob 38 forward and releasing it. This action causes selected electromagnets to be energized to reverse the polarities of corresponding portions of the magnetizable material in the card. In this manner, the card is coded.

After a card is thus coded, the lever 28 is actuated, by pulling its knob 34 forward, so that the card can be removed from the slot 18. Simultaneously, this action causes any depressed pushbuttons in rows A, B, C, D to be released.

FIGS. 7 and 8 illustrate the arrangement of the plates and electromagnets above mentioned. Within the housing of the apparatus is a stationary platform 44 which supports two groups 46, 48 of coils 50. In the arrangement shown, each group 46, 48 comprises forty coils arranged in four rows of ten coils each. Still further, coils in the opposed rows are coaxially aligned. As shown, each of the coils 50 has a respective magnetic core 52, and the ends of the cores 52 of each group are supported in respective pairs of parallel plates 54, 56 and 58, 60 suitably fastened together. The outer plates 54, 58 are magnetic plates and the inner plates 56, 60 are nonmagnetic. The magnetic plates 54, 58 are made of material, e.g., soft iron, characterized in that it is easily magnetized in the presence of a magnetic field, and does not retain magnetism when the field is removed.

In this arrangement of the coils, one group 48 is stationary, and the other group 48 is movable. Further, the group 48 is normally biased so that its inner plate 60 is urged toward the confronting plate 56. Still further, the lower edges of the outer plates 54, 58, and the lower edges of the portions of the inner plates 56, 60 through which the cores 52 extend, are elevated above the platform 44. In this latter connection, the outer end portions of the plates 56 may be mounted on the upstanding legs of angle elements 64 which are secured at 66 to the platform 44.

A pair of pins 70, which are parallel to the coils 50, extend through aligned openings in the inner plates 56, 60. The pins 70 slidingly engage the plate 56 but are secured to the plate 60, as by being press fit therein. As shown, the forward ends of the pins 70 extend through guide openings in the upstanding legs of angle elements 72, the lower legs of which are secured at 74 to the platform 44. Compression springs 76 extend between the upstanding legs of the angle elements 72 and the front surface of the plate 60, and to this end may be slipped onto the pins 70. Thus, the springs 76 constantly urge the plate 60 toward the plate 56.

In the above-described arrangement, it will be seen that forward movement of the pins 70 carries the plate 60 forwardly, to separate the plate 60 from the plate 56. Further in this regard, index pins 80, 81 are provided which are secured to the plate 56, and slidably extend through the plate 60. The pins 80 are spaced apart a distance such that when a card is inserted in the slot 18 (FIG. 1), to pass between the plates 56, 60, the ends of the card slidingly engage the pins 80. The pins 81 are positioned below the coils so as to be engaged by the lower edge of the card.

To effect the desired movement of the pins 70 and plate 60, the rear ends of the pins 70 are engaged by upwardly extending arms 82 which are pivotally mounted at 84 on the platform 44. The arms 82 extend from a plate 86 below the platform 44, and an actuating rod 90 is secured at 92 to the plate 86.

At its forward end, the rod 90 is connected by a tension spring 94 to a stationary frame 96 in the housing of the apparatus, such spring 94 constantly urging the rod 90 forwardly. In the forward position of the rod 90, the upper ends of the arms 82 are in a position in which they are barely touching the rear ends of the pins 70, and the springs 76 urge the plate 60 into face-to-face engagement with the plate 56.

The lever 28 is shown as a pin extending from the upper end of a flat bar 98 which is pivotally mounted at 100 to a stationary frame portion 102. The bar 98 extends below the frame portion 102, and at its lower end is attached at 104 to the forward end of the rod 90. Thus, when the knob 34 is pulled forward, the lower end of the bar 98 rotates clockwise in FIG. 7, causing the bar 90 to be moved rearwardly. Such movement of the rod 90 effects clockwise rotation of the plate 96, and hence the rods 82, whereupon the pins 70, and hence the plate 60, move forward to separate the plates 56, 60 and permit a card to be dropped between them.

In FIG. 8, a card 106 is shown in phantom in position between the plates 56, 60. It will be recalled that after the plate 60 is separated from the plate 56 as above described, the knob 34 is released. This permits the springs 76, 94 to cooperate in moving the plate 60 rearwardly until the card 106 is firmly clamped between the confronting faces of the plates 56, 60. With the card 106 thus clamped, the coils 50 are energized to magnetize the portions of magnetic material embedded in the card which are aligned with the cores 52.

As previously mentioned, the lower edges of the plates 54, 56, 58, 60 are elevated above the platform 44. Referring to FIG. 8, a plate 108 is secured at its rear edge to the lower edge of the plate 54, and extends below the lower edges of the plates 56, 60 to the lower edge of the plate 58. The lower edge of the plate 58 rides on the forward edge of the plate 108, and to this end the forward edge of the plate 108 may be enlarged as at 110, to provide a rail on which the lower edge of the plate 48 can slidably move.

In FIG. 8, it will be seen that when the plate 60 is separated from the plate 56 so that the card 106 can be dropped between them, the lower edge of the card comes to rest on the top of the pins 81. Thus, since the ends of a card dropped between the plates also engage the pins 80, the arrangement provides indexing means for cards in which discrete portions of magnetic material therein to be magnetized are located between the ends of coaxial cores 52. In this connection, the pins 80 preferably are spaced so that the distances between the edges of the card and the nearest coils are different. To better understand how this arrangement facilitates proper indexing of a card for magnetizing and coding, reference will be made to FIGS. 13–17.

Figure 13:
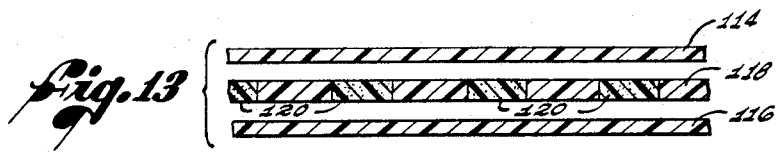
FIG. 13 is a fragmentary sectional view of three plastic layers for forming a card to be magnetized in accordance with my invention, wherein the center layer supports spaced disks adapted to be axially magnetized.
Figure 14:
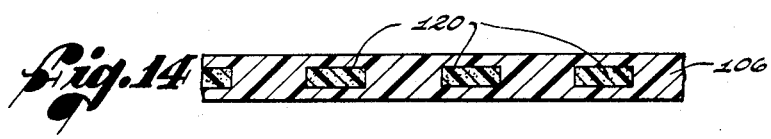
FIG. 14 is a fragmentary sectional view of a composite card formed of the layers of FIG. 13.

FIG. 13 illustrates sectional view of thin plastic sheets 114, 116 e.g., each 0.010″ thick, which may be opaque or transparent, to be fused with a middle plastic sheet 118 which carries spaced disks 120 of magnetic material which is adapted to be magnetized to form permanent magnets. The sheet 118 and disks 120 are somewhat thicker than the sheets 114, 116, e.g., 0.015″–0.020″ thick. Such material may, for example, be barium ferrite in a rubber or plastic base, that can be magnetized and will retain such magnetism sufficiently to be characterized as a permanent magnet. As explained in my copending application, Magnetic Card and Validator Apparatus, Ser. No. 650,483, filed June 30, 1967, holes are punched in the plastic sheet 118, and disks 120 are punched from a sheet of the magnetic material. Such disks 120 are forced into the openings in the sheet 118, and then the sheet 118 is placed between sheets 114, 116 to be fused under heat and pressure to form a monolithic card 106 (FIG. 14). Thus, the card 106 is a single plastic element with the disks 120 embedded therein.

Figure 16:
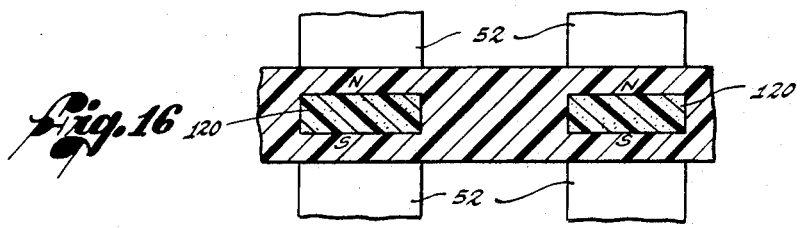
FIG. 16 is a fragmentary sectional view taken along the line 16—16 of FIG. 15.

In FIG. 16, the card 106 is shown in a position wherein adjacent disks 120 are positioned on the axes of aligned cores 52 of the coils previously described. With the coils appropriately wound and energized, the disks 120 can be permanently magnetized, and in such a manner that their corresponding faces can be of the same or of opposite polarities. In the arrangement shown in FIG. 16, the disks 120 are shown to have been axially magnetized so that their coplanar faces are of opposite polarities.

Figure 15:
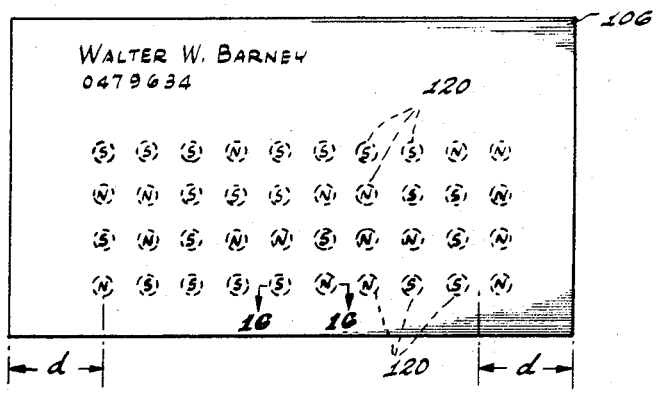
FIG. 15 is a plan view of the front face of a credit card formed as in FIG. 14, showing how the card is dimensioned to be properly indexed for magnetizing the disks, and showing the disks in dotted outline with polarity indications of a representative master pattern.

FIG. 15 illustrates the card 106 as a credit card, wherein the owner's name and other identification are embossed upon the front of the card above the rows of disk magnets 120, which are indicated in dotted lines. Further, the faces of magnets adjacent the front of the card are poled in accordance with a predetermined mastern pattern. The pattern may be random as in the manner shown in FIG. 15, or it may be a symmetrical pattern. Whatever the pattern, the disks in all cards are initially magnetized so that the polarities of the faces of the disks adjacent the front surfaces of the cards are identical. With such a card placed in a validator as previously mentioned, wherein each of the disk magnets 120 is aligned with a movable magnet, all movable magnets are effected in the same manner, e.g., all movable magnets are attracted to the disk magnets 120. Coding of the card 106 is effected by reversing one or more magnets in each row, so that corresponding movable magnets in the validator are reversed in the example mentioned to close corresponding switches.

Figure 17:
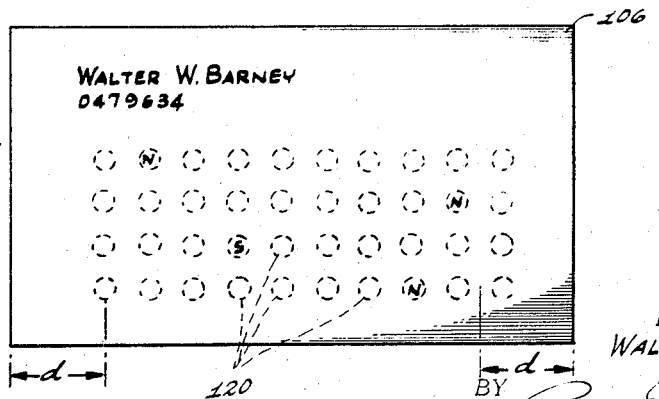
FIG. 17 is a plan view of the card as in FIG. 15, but showing the reversed polarities of selected disk magnets reversed to code the card.

FIG. 17 illustrates the card 106, again with the disk magnets 120 illustrated in dotted lines, but wherein, for purposes of simplicity, the polarities of only the "coded" magnets are indicated. In this connection, the card 106 has been coded by reversing the polarities of the second magnet in the top row, the ninth magnet in the second row, the fourth magnet in the third row, and the eighth magnet in the bottom row. When the card in FIG. 17 is placed in a validator as previously mentioned, these four magnets effect operation of the movable magnet switches for the desired purposes.

Again referring to FIGS. 15 and 17, the card 106 is dimensioned so that the disk magnets 120 at the extreme left ends of the rows are on a line a distance, $d$, from the left edge of the card. From the right edge of the card 106, a line parallel to such edge and a distance, $d$, from it falls midway between the last two disk magnets 120 in the various rows.

Referring to FIGS. 7 and 8 along with FIGS. 15 and 17, when such a card is placed between the plates 54, 60, with its front surface facing the front of the apparatus of FIG. 1, the disks 120 are automatically located between axially aligned cores 52. In this connection, the distance between the top of the plate 108 and the centers of the bottom row of coaxial cores is the same as that between the lower edge of the card 106 and the centers of the bottom row of disks 120 therein. Also, the left-hand pin 80 is positioned so that the portion thereof engaged by the edge of a card is the distance, $d$, from a line through the centers of the first cores 52 on the left.

To magnetize the disks as above described, the coils between which each disk is located are connected so that the magnetic fields through their cores are aiding. In this connection, the magnetic plates 54, 58 have the unique function that when all of the coils are energized in a pattern as above mentioned, the plates 54, 58 interconnect the various cores magnetically, providing magnetic loops that are closed except for the gaps between the inner ends of the cores and the adjacent faces of the disks 120. Thus, flux in one direction through a pair of coaxial cores aids flux in the opposite direction through another pair of coaxial cores. By this means, strong magnetic lines of force can be concentrated through each of the disks to magnetize them initially and make permanent magnets of them. By this same means, the polarities of selected ones of such permanent magnets are reversed, and the card is thereby coded.

Still further, the plate 108, like the cores 52 and plates 54, 58, is a magnetic plate that is easily magnetized in the presence of a magnetic field, and demagnetizes upon removal of the field. The plate 108 further aids in providing magnetic paths which include the various cores, and which are closed except for the gaps between the inner ends of the cores and the adjacent faces of the disks 120. In fact, the plates 54, 58 and 108 and each pair of coaxial cores constitute the equivalent of a C-shaped core with closely spaced ends, e.g., 0.035″ separation, between which to provide a high concentration of flux. Thus, the plates 54, 58 and 108 form common parts of cores for all of the electromagnets.

Initial magnetization and polarity reversal of the disk magnets are effected by pulsing the coils. All of the coils are pulsed simultaneously in initially magnetizing the disks in the card. Also, the card is coded by simultaneously pulsing selected coils in each of the rows to reverse the polarities of the associated disk magnets. A circuit arrangement for accomplishing these operations in accordance with my invention is illustrated in FIGS. 11 and 12.

Figure 2:
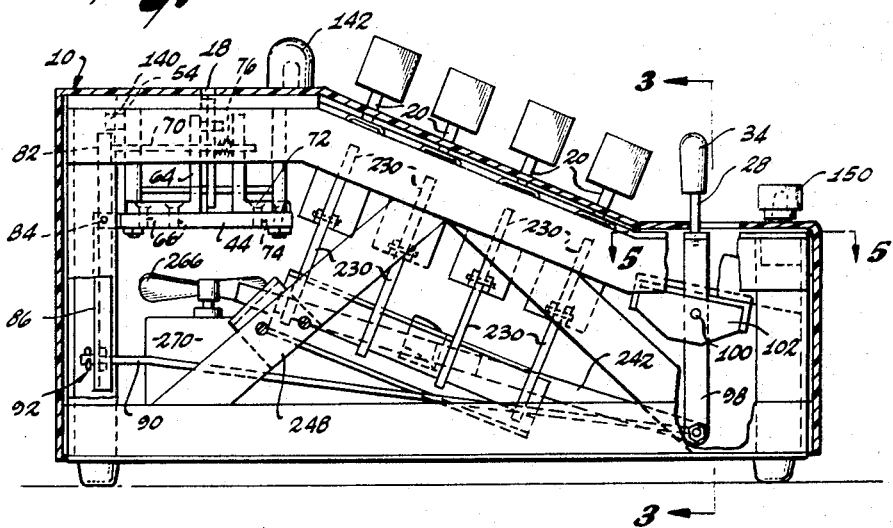
FIG. 2 is a sectional view taken along the line 2—2 of FIG. 1 showing the cooperative arrangement of card and button release mechanisms.

Referring to FIG. 11, power lines 130, 132 are adapted for connection to a conventional A-C voltage source, e.g., the outlet of a 115-volt house supply. One of the lines 130 is shown connected through a fuse 134 to the fixed contact of normally open switch 136. Between the movable contact of the switch 136 and the other line 132 are connected a resistor 138, a thermostat switch 140 and a neon lamp 142 with its limiting resistor 144. The lamp 142 is shown in FIGS. 1 and 2 near the forward edge of the upper horizontal surface 14 of the housing 10. The thermostat 140 is shown in FIG. 2 to be placed next to the fixed magnetic plate 54. Also, a neon lamp 146 and its limiting resistor 148 (FIG. 11) are connected between the movable contact of the switch 136 and the lead 132. If desired, the switch 136 and the lamp 146 are enclosed in a luminescent housing, indicated in dotted lines at 150 in FIG. 11. In FIGS. 1 and 2, the housing 150 is shown near the forward part of the lower horizontal surface of the housing 10. Thus, when the power switch 136 is closed, the glowing lamp 146 causes the housing 150 to luminesce and thereby indicate that power is on.

Again referring to FIG. 11, a transformer 152 is shown which has its primary winding 154 and secondary winding 156 connected together at one end to one input terminal 158 of a full-wave rectifier 160. As shown, the primary winding 154 is connected between the input terminal 158 and the line 132, and the lower end of the primary winding 154 is connected to one fixed contact of a single-pole, double-throw switch 162, the movable contact of which is connected to the other input terminal 164 of the rectifier 160. The lower end of the secondary winding 156 is connected to the other fixed contact of the switch 162.

A relay R has a normally open switch 166 connected between the input terminal 158 of the rectifier 160 and the junction 168 between the thermostat switch 140 and the resistor 144. In the arrangement shown, a resistor 170 is connected at one end to the movable contact of the switch 166, and a diode 172 is connected in the forward direction between the other end of the resistor 170 and one fixed contact of a single-pole, double-throw switch 174. The movable contact of the switch 174 is normally biased against its other fixed contact, i.e., out of contact with the diode 172. As shown, a capacitor 176 is connected between the movable contact of the switch 174 and the line 132. Further, the coil of the relay R is connected between the line 132 and the fixed contact of the switch 174 against which its movable contact is normally biased.

In the circuit thus far described, and with the power switch 136 closed, moving the movable contact of the switch 174 into contact with the diode 172 causes the capacitor 176 to be charged. In this connection, the diode 172 functions as a half-wave rectifier. From the line 130, the path to the other line 132 is traceable through the power switch 136, the resistor 138 and thermostat switch 140, the resistor 170 and diode 172, and the switch 172 and capacitor 176.

When the switch 174 is released to return its movable contact to its normal position, the coil of the relay R is connected across the capacitor 176, whereby a current pulse is fed through the coil to energize it. With the relay R thus energized, its switch 166 closes. With the movable contact of the switch 162 in the position in which the input terminal 164 of the rectifier 160 is connected to the line 132, closure of the relay switch 166 causes the input terminals 158, 164 of the rectifier to be connected across the power lines 130, 132, i.e., the 115-volt line voltage is applied to the rectifier 160.

However, when the movable contact of the switch 162 is in the position in which the secondary winding 156 of the transformer 152 is connected across the input terminals to the rectifier 160, closure of the relay switch 166 in the manner described connects the transformer primary winding 154 across the lines 130, 132. In such case, the input to the rectifier 160 is the voltage impressed across the secondary winding 156. In apparatus built in accordance with my invention, the transformer 152 is a step-down transformer, having a turns ratio of approximately 4:1 so that approximately 30 volts is across the secondary winding 156 when the line voltage is impressed across the primary winding 154.

When the higher (line) voltage is applied to the input of the rectifier 160, the output of the rectifier is utilized to energize all of the previously described coils simultaneously. When the lower voltage from the secondary winding 156 is applied to the input of the rectifier 160, the output of the rectifier is utilized to simultaneously energize the coils which have been selected for coding a card. The output of the rectifier is filtered, as indicated by the capacitor 180 connected across the output lines 182, 184. As indicated, lines 186, 188 are directly connected to the lines 182, 184, and are designated "erase" lines. Also, "code" lines 190, 192 are provided in which one line 190 is directly connected to one of the lines 184 from the output of the rectifier 160, and a switch 194 is connected between the remaining code line 192 and the other output line 182 of the rectifier 160.

As indicated, the movable contacts of the switches 162, 194 are mechanically linked. The operation of the linkage is such that the switch 194 is open when the switch 162 is in the position in which the higher voltage is applied to the input of the rectifier 160, and is closed when the switch 162 is positioned to connect the secondary winding 156 across the input of the rectifier. In this manner, I eliminate the possibility of applying to only a few coils the higher voltage that appears in the output of the rectifier 160 wherever its input terminals are connected to the power lines 130, 132.

FIG. 12 illustrates a circuit of my invention for energizing all coils simultaneously via the erase lines 186, 188, and for energizing selected coils via the code lines 190, 192. Referring to FIG. 12 along with FIG. 1, each of the pushbuttons is adapted to actuate a respective double-pole, single-throw switch. In FIG. 12, two rows of such switches numbered 0, 1, 2, . . . 9 are shown for the corresponding rows of pushbuttons A, D. It will be understood that such rows of switches are also provided for the rows of pushbuttons B, C located between the rows shown in FIG. 12. All of these switches in all rows have one movable contact connected to one of the code lines 190, and the remaining movable contacts of such switches are connected to the other code line 192.

As further shown in FIG. 12, respective pairs of coaxial coils 50 (see FIGS. 7 and 8 along with FIG. 12) are serially connected between the fixed contacts of the switches 0, 1, 2, . . . 9. Thus, when any pushbutton is depressed to close its corresponding switch, the coils 50 connected to its contacts are connected across the code lines 190, 192.

As previously indicated, all of the coils 50 are adapted for connection across the erase lines 186, 188. In the arrangement shown, I do this by connecting all of the coils in each row in series, and connect the various rows in parallel across the erase lines. For such series-parallel arrangement, I provide eleven single-pole, single-throw switches 200 for each row of ten pairs of serially connected coils 50. As inspection of FIG. 12 shows, the fixed contact of the switch 200 on the extreme left in each row is connected to one of the erase lines 188, and the movable contact of the switch 200 at the extreme right of each row is connected to the other erase lines 186. In between, the movable contact of each switch 200 and the fixed contact of the adjacent switch 200 are connected to the ends of an associated pair of serially connected coils 50. Further, the movable contacts 200 in all of the rows are ganged for simultaneous operation. Accordingly, when the switches 200 are closed, it will be observed that all of the coils in each row are connected in series between the erase lines 186, 188.

Referring to FIG. 11 along with FIG. 12, the switches 200 are closed when the switch 162 is in the position for connecting the power lines 130, 132 to the input of the rectifier 160. In such case, the switch 194 is open, so that the rectifier 160 is not connected to the code lines 190, 192, and the high voltage output of the rectifier 160 is connected through the erase lines 186, 188 for energizing all of the coils 50 in all of the rows.

When the switch 162 is thrown to the position for connecting the secondary winding 156 of the transformer 152 to the input of the rectifier 160, the switches 200 are opened and the switch 194 to the code lines is closed. In such case, depending upon which of the pushbutton controlled switches 0, 1, 2, . . . 9 in the rows A–D are closed, only the serially connected coils connected to such closed switches are energized from the low voltage output of the rectifier 160. Of course, these coils in the different rows are in parallel in this arrangement.

Referring to FIGS. 1, 3 and 6, the positions of the switches 162, 194 and 200 are controlled by the lever 30. When the knob 36 is pushed to the rear, i.e., to the "erase" position, the switches 200 are closed; the switch 162 is in the position for connecting the input of the rectifier 160 to the power lines 130, 132; and the switch 194 is open. When the knob 36 is pulled forward to the "code" position, the switches 200 are open; the switch 162 is in the position for connecting the secondary winding 156 to the input of the rectifier 160; and the switch 194 is closed. As shown in FIGS. 3 and 6, the lever 30 is formed of a pin that is secured to a U-shaped bar 202 which has the ends of its legs secured to a shaft 204. The bar 202 carries a forwardly extending finger 206, the end of which is adapted to engage the movable contact of the normally open switch 194. Further, a flexible cord 208 is connected between the bar 202 and the movable contact of the switch 162. In the "erase" position of the lever 20, the cord 208 is taut, and holds the movable contact of the switch 162 against the fixed contact thereof via which (see FIG. 11) to connect the input terminals of the rectifier 160 to the power lines 130, 132. When the lever 30 is moved forward, the movable contact of the switch 162, which preferably is a spring element normally biased toward its other fixed contact, moves into engagement with such other fixed contact before the end of the finger 206 closes the switch 194.

The various ganged switches 200 previously described (FIG. 12) may be conveniently provided by the use of rotary switches. Such switches may be of the type having a plurality of pairs of contacts spaced around an insulating member, with appropriate connections between the coils and the contacts, and having a rotary member carrying a conductive element shaped for simultaneously bridging the pairs of contacts in one position and breaking contact between them in another position. Such conventional switches are shown at 210 in FIGS. 3 and 6, wherein the handles 212 for operating the rotary members of such switches are secured to the bar 202. There are eight switches 210 in the arrangement shown, in which case two switches 210 are used to furnish the necessary contacts forming the switches 200 for each row of ten pairs of coils.

Referring to FIGS. 1–5, each bank of pushbuttons A–D may be of a conventional construction. In such a construction so shown in FIG. 4, the plungers 20 extend through an elongated housing 220. A respective compression spring 222 extends between the bottom of the housing and the lower portion of each plunger 20, for normally biasing the plunger upwardly. An elongated bar 224 extends through the housing 220 and is provided with projections adapted to be inserted in openings or notches in the plungers 20. The upper portions of these projections have cam surfaces, so that when a plunger 20 is forced downwardly, the projection is cammed out of the notch and the plunger moves down until the next succeeding notch aligns with the projection. At one end of the housing 220 (the left end in FIG. 4), a compression spring 226 extends between the end of the bar 224 and a stationary wall 228, for biasing the bar 244 to the left to cause the projections thereon to enter the notches in the plungers 20. To release a depressed plunger, the bar 224 is subjected to longitudinal movement (to the right in FIG. 4), thereby clearing the projection from the slot in which it is engaged, to permit the associated spring 222 to force the plunger back to its upper position.

Such pushbutton mechanisms typically are arranged with contacts fixed on the outer surface of the housing 220, and with movable contact slidable on the outer surface of the housing. The movable contacts are carried by the plungers, to be moved into and out of engagement with the fixed contacts. The details of such contact arrangements are not shown. Schematically, one pushbutton controlled switch is shown beneath the plunger 20 of the pushbutton "9" in FIG. 4, wherein the movable contacts are normally biased out of engagement with the fixed contacts. It is apparent that when the plunger of the pushbutton is depressed, the movable contacts are forced downwardly to bring them into engagement with their fixed contacts.

As previously mentioned, operating the card release lever 28 automatically releases any pushbutton that has been depressed. To this end, and referring to FIGS. 2 and 4, I provide respective levers 230 which have their upper ends adapted to engage the outer ends of the bar 224, and to be pivoted to move the bars in the manner above described for releasing the plungers 20. As shown in FIG. 4, each of the levers 230 is pivotally mounted at 232 near its upper end adjacent the bottom of the housing 220. The lower ends of the levers 230 are ganged, as by a bar 236 to which their lower ends are secured.

On its inner surface, the bar 236 carries a cam follower element 238. This cam follower is disposed in the path of a cam element 230 that is carried on a bar 242. The bar 242 is pivotally mounted at one end, at 244, on the lower end of the bar 98 (see FIGS. 2, 5 and 7). The rear end of the bar 242 is supported for sliding movement, as in a slot (not shown) in a plate 248 that is secured to the frame. Accordingly, when the knob 34 is pulled forward to separate the plates 56, 60, between which a card is to be inserted, the bar 242 simultaneously is moved rearwardly. Upon such movement of the bar 242, its cam 240 forces the follower 238 out of its path to thereby pivot the levers 230, whereupon the bars 224 for all banks of pushbuttons are simultaneously actuated to release all pushbuttons that have been depressed.

As previously mentioned, the lever 32 in FIG. 1 is used to energize coils in both positions of the lever 30. In this conection, the lever 32 operates the switch 174 of FIG. 11 that is used to energize the relay R as already described for applying a high or low voltage to the input terminals of the relay 160 (depending upon the position of the switch 162). Referring to FIGS. 9 and 10, the lever 32 is formed of a pin mounted on the top of a bar 250 that is pivotally mounted at 252 on a frame portion 254. The lower end of the bar 250 is conected to one end of a rod 256 which is connected at its other end to a lever 258 for operating the plunger 260 of the switch 174. As shown, a spring 262 is connected between the lower end of the bar 250 and the frame portion 96.

In the position of the lever 258 shown in FIGS. 9 and 10, the plunger 260 is extended, and in such position the switch 174 is in the condition shown in FIG. 11, wherein its movable contact engages the fixed contact that is connected to one end of the relay coil. When the knob 38 is pulled forward (to the right in FIG. 9), the arrangement described causes the lever 258 to move to depress the plunger 260, whereupon the switch 174 operates so that its movable contact moves against the fixed contact thereof that is connected to the diode 172. Thus, for both the "erase" and "code" positions of the lever 30, operating the switch 174 as above described causes the capacitor 176 to be charged. Accordingly, upon release of the knob 38, to permit the spring 262 to return the lever 32 to its rear position, the charge on the capacitor 176 is utilized to energize the relay R and close its switch 166.

With encoder apparatus in accordance with my invention, I can accurately locate and magnetize hidden disks that are quite small, e.g., 0.125" diameter, and closely spaced, e.g., centers that are 0.25" apart. As such dimensions indicate, the cores are correspondingly small and closely spaced. Accordingly, the coils 50 are even more closely spaced. For example, coils slightly less than 0.25" diameter have been used to provide sufficient clearance for air to pass between adjacent coils.

Despite the close spacing of the coils 50, they are not subject to dangerous overheating. In the operation of the circuit above described, the capacitor 176 is of such size, e.g., 25 μfd., to limit the pulsing of the coils to a period sufficient to magnetize disks 120 and thereby avoid overheating the coils. To aid in dissipating such heat as occurs, I prefer to assemble the coils so that there is a slight separation between them. Further, I provide a fan 266 (FIG. 2) which is mounted directly below the coils. Also, as best seen in FIG. 1, I provide a plurality of openings 268 in the upper horizontal surface 14 of the housing 10 adjacent the slot 18. Thus, air pushed by the fan 266 readily circulates between the coils and passes out of the housing. Further in this regard, it will be noted in FIGS. 7 and 8 that the plate 86 has a plurality of openings through which to permit air to pass upward to reach the coils above it. If desired, openings may be provided in the bottom plate of the housing, as well as side and back walls, to aid in circulation of cooling air.

The fan motor 270, which is mounted on the bottom of the housing of the apparatus, is connected directly across the power lines 130, 132 (FIG. 11) when the power switch 136 is closed. In FIG. 11, the motor 270 is shown connected between one of the lines 132 and the movable contact of the power switch 136.

From the foregoing, it will be seen that with encoder apparatus in accordance with my invention, credit cards and security pass cards can be accurately processed in high volume. An operator of the encoder has only the few simple steps previously outlined to observe in processing each card. After encoding a card as described, it may be checked, e.g., as in a validator designed to accept the card and establish a visual and/or audible indication that it possesses a code. In this connection, if the operator has reversed the card on inserting in the encoder, none of the disks will be magnetized because the disks will not be aligned with the cores. With a validator as disclosed in my aforementioned copending application, the same sequence of pushbuttons may be operated as with the encoder, in which case an indication is established as to whether the two codes match, i.e., the pushbutton code and the disk magnet code.

In this latter connection, the coils and switches 0, 1, 2, ... 9 (see FIG. 12) which are wired together are not in the same relative positions. Thus, operating pushbutton "0" in row A does not connect switch "0" to the first pair of coaxial coils in the top row of such coils, but rather to another pair of coaxial coils in that row. Thus, the operator of the pushbutton keyboard of the encoder of FIG. 1 does not known which portions of a card have been coded. This point will be further elaborated following the description of FIGS. 18–23.

FIGS. 18 and 19 illustrate the construction of a card of my invention which lends itself to a greater variety of codes. The card is formed of three plastic sheets 274, 276, 278, the middle sheet 276 being a homogeneous sheet made of the same material as the disks 120 of the card of FIGS. 13–17. As shown in FIG. 19, the sheets of FIG. 18 are fused together to form a monolithic plastic card 280 having a center region 282 of homogeneous material adapted to be magnetized, e.g., the same type of material as used to make the disk magnets previously described. As shown in FIG. 19, magnetized coaxial cores 52 force lines of flux through the card 280, and cause the portions of the region 280 intermediate the cores 52 to be magnetized as indicated, i.e., as disk magnets where the cores are of circular cross-section.

FIG. 20 illustrates the card 280 as seen from one longitudinal edge thereof. The card is illustrated as having been magnetized by the apparatus of FIG. 1, wherein the discrete portions placed between confronting ends of one row of coaxial cores having been magnetized. Such portions are indicated in dotted lines, and are shown with polarity indications resulting from the manner in which the coils are wound and pulsed pursuant to a master pattern. The space between adjacent magnetized portions is slightly greater than their diameters. The distance $d$, from the left end of the card 280 in FIG. 20, is the distance from the end of the card to the center of the first magnetized area. From the right hand of the card in FIG. 20, the distance $d$ falls midway between the last two magnetized portions.

After the card 280 is magnetized as in FIG. 20, (by inserting it in the slot 18 of FIG. 1, moving the lever 30 to the "erase" position, and momentarily pulling the knob 38 forward), it is removed from the slot (by pulling the card release knob 34) and reversed and reinserted in the slot 18. With the lever 30 remaining in the "erase" position, the knob 38 is again momentarily pulled forward whereupon the portions of the homogeneous layer 282 intermediate the magnetized portions of FIG. 20 are similarly magnetized in accordance with the master pattern. Viewing the same edge of the card in FIG. 21, the upper surface in FIG. 21 is the lower surface in FIG. 20, and inspection of the magnetized areas in these figures reveals the interwoven master patterns.

It will now be apparent that in the card of FIGS. 13–17, additional disks 120 can be provided intermediate the disks shown, and the same procedure can be followed to establish the master pattern from both sides of the card. However, the card of FIGS. 18–21 has the advantages that punching of a plastic sheet and inserting disks therein is not necessary, and the homogeneous character of the region 282 makes it impossible to X-ray the card to determine the positions of the discrete magnetized portions.

To further confuse attempts to decode such a card, the sheet 276 from which the region is formed may be initially magnetized throughout all or a portion thereof, as in a pattern or matrix wherein, in the encoder, confronting cores span initially magnetized portions of different polarities. I have found that only the portions of the region 282 confronting the cores are affected by flux through them. Accordingly, the energized coils establish magnetized portions in the desired manner, whether or not the portions of the region 282 between the cores are already magnetized.

FIG. 22 illustrates the face of the card that corresponds to the lower surface in FIG. 21. In FIG. 22, the second vertical row of magnetized portions is centered on a line the distance $d$ from the left edge of the card. With the card inserted in the slot 18 of the apparatus of FIG. 1, wherein the face of the card viewed in FIG. 22 faces the front of the apparatus, the lever 30 is pulled forward to the "code" position and the knob 38 is momentarily pulled forward to code the card. By pushing appropriate pushbuttons in the rows A–D, the polarities of selected portions in the card are reversed to code the card. The card can then be reversed, and a different code can be inserted therein by pushing different pushbuttons and following the same procedure for energizing the associated coaxial coils.

In this latter connection, credit cards can be coded so that the customer knows which surface of the card should be facing him when he places it in a validator, and the sequence in which he should operate manual switches of the validator. Thus, the card may have an authentic code and a false code, and only the customer will know the authentic code.

As previously mentioned, it is preferred that the positions of the magnetized areas of the card are not the same relative to the positions of the encoder pushbuttons. For example, and referring to FIG. 23, one of the codes put into the card is effected by reversing the polarities of the following magnetized portions in one of the master patterns: the first portion in the top row, the second portion in the second row, the third portion in the third row, and the first portion in the bottom row. This does not mean that such a code is established by pressing the "0,"

"1," "2," "0" pushbuttons in the respective rows A, B, C, D. This would be the case, of course, if the wiring of the coaxial coils was such that pressing the "0" pushbutton in any row would connect the first coaxial coils in that row to the code lines, etc. However, the coding scheme preferably is such that the operator of the coding device does not know which area of a card will be magnetized when a particular pushbutton is pressed. For example, the operator's instructions may be to press pushbuttons "5," "9," "3" and "7" to code a particular card, but the wiring is such that pushbutton "5" in row A connects the first pair of coaxial coils in the top row to the code lines; pushbutton "9" in row B connects the second pair of coaxial coils in the next row to the code lines; pushbutton "3" in row C connects the third pair of coaxial coils in the third row to the code lines; and pushbutton "7" in the bottom row connects the first pair of coaxial coils in the bottom row to the code lines. Accordingly, it will be seen that persons operating the encoder of my invention are unaware of which portions of the card are being magnetized or reversed in polarity.

The customer who receives a card that has been coded as above described is also unaware of which portions of the card have been magnetized. So that he can use the card, the validator has switches operated by movable magnets that are operated when the coded portions of the card are aligned therewith, and pushbutton switches in series with such magnet-operated switches must be closed. In a validator as disclosed in my copending application, pushbutton switches are also provided which conform in number and arrangement to the pushbutton switches described herein. Accordingly, the customer with the card above described will operate the same sequence of pushbuttons, i.e., "5," "9," "3," "7." The combined operations of such magnetically operated and manually operated switches effect validator circuit operation which establishes a visual indication that the code in the card and the pushbutton code match.

From the foregoing, it will be apparent that the customer follows the same pushbutton sequence as the operator does in encoding the card in the first place. It is also possible with my encoder to wire the coils 50 and the pushbutton switches 0, 1, 2, . . . 9 (FIG. 12) so that the pushbuttons in rows A, D correspond directly to the portions of the card magnetized in accordance with the master pattern. In such arrangement, of course, the operator knows that when she presses, say, the "0" pushbutton, in each of the rows A–D, the polarities of the magnetized portions that will be reversed (upon operating the energize switch 174) will be the first portion in each row. However, she will not know the sequence of manually operated switches which the customer must operate at the validator when the inserts such a card therein. In this connection, such a card in a validator of my corresponding application automatically actuates magnet operated switches having movable magnets aligned with the first magnetized area in each row in his card. However, he must operate manual switches which are in series with such magnet operated switches before the validator circuitry will establish a visual indication that his card is a proper one. Accordingly, a person who encodes such cards with the encoder apparatus of my invention will be unable to tell the validator pushbutton code associated with that card. In such a maximum security system, of course, it is necessary that each card thus coded be passed to a control center to check to see which portion of the card have been coded, and at which to determine from a master code pattern the validator pushbutton sequence that corresponds to the code in the card and which must be furnished to the customer. Thus, while an encoder operator knows the portions of the card that have been reversed in polarity to code the card, she does not know the customer's manual switch code. Correlatively, when the customer receives his card, he alone knows his manual switch code, though he does not know which portions of his card have been magnetized to form the code therein.

As will now be apparent, cards in accordance with my invention may be magnetized in as many different portions as desired, and have the capacity for many millions of codes. As an example of the versatility of my card and encoder apparatus, the card of FIGS. 18–23 can be coded four ways. In addition to the two ways shown, the card can be turned upside down, and magnetized and coded from both sides as already described. Where forty areas are magnetized each time in the erase position, this arrangement provides a card with 160 magnetized areas. Further, if desired, the capacity can readily be doubled, by arranging in each position of the card to shift it vertically a distance equal to half the distance between the centers of previously magnetized areas. In this manner, the same procedure as just mentioned can be followed, thereby providing a card having 320 magnetized areas. By increasing the number of coaxial electromagnets for a given (or larger) card area, it can be seen that my invention provides means to make a card that has the capacity for billions of codes.

From the foregoing, it will be apparent that various modifications can be made in the embodiments of cards and encoder apparatus described herein without departing from the spirit and scope of my invention.

I claim:
1. The combination, for permanently magnetizing discrete portions of magnetic material embedded in an opaque card, wherein such portions have not been previously magnetized, of:
 a plurality of rows of coaxial electromagnets having respective cores surrounded by coils, the coils of each pair of coaxial electromagnets being connected in series;
 means for supporting the card between the confronting ends of said cores;
 indexing means for positioning the card so that each area of magnetic material therein which is to be magnetized is located between the confronting ends of a respective pair of cores;
 means through which to energize said coils to establish magnetic flux paths through said cores and card portions to permanently magnetize the card portions;
 and means operable, after permanently magnetizing said card portions, to energize selected pairs of serially connected coils in a direction to reverse the flux through the associated cores and reverse the polarities of the associated permanently magnetized portions,
  all pairs of coils except said selected pairs being deenergized during operation of said last-named energizing means.

2. The combination, for permanently magnetizing discrete portions of magnetic material embedded in an opaque card, wherein such portions have not been previously magnetized, of:
 a plurality of rows of coaxial electromagnets having respective cores surrounded by coils, the coils of each pair of coaxial electromagnets being connected in series;
 means for supporting the card between the confronting ends of said cores;
 indexing means for positioning the card so that each area of magnetic material therein which is to be magnetized is located between the confronting ends of a respective pair of cores;
 means through which to energize said coils to establish magnetic flux paths through said cores and card portions to permanently magnetize the card portions;
 said energizing means including
  a plurality of switches operable simultaneously to connect all of said serially-connected coils to a power source to be energized simultaneously,
  a respective switch for each pair of serially connected coils individually operable to connect its coils to the power source so as to reverse the flux through the associated pair of coils and re-reverse the polarity of the associated permanently magnetized card portion;

and means to prevent simultaneous operation of said plurality of switches when said respective switches connect their coils to the power source.

3. In combination:

a pair of spaced, parallel magnetic plates;

a plurality of parallel magnetic cores extending from each magnetic plate toward the other plate, each core extending from each plate being coaxial with a core extending from the other plate, the confronting ends of said cores being in parallel planes and spaced to receive a magnetic card therebetween;

a respective coil surrounding each core, the coils around each pair of coaxial cores being connected in series, and a plate of magnetic material extending between and engaging both magnetic plates.

4. The combination of claim 3, including:

a pair of parallel nonmagnetic plates, the cores from each magnetic plate extending into a respective one of said nonmagnetic plates.

5. The combination of claim 4, wherein the confronting surfaces of said nonmagnetic plates are flush with the ends of the cores extending therethrough.

6. The combination of claim 5, including:

a pair of indexing elements intermediate said nonmagnetic plates to be slidably engaged by the ends of a card placed between said nonmagnetic plates.

7. The combination of claim 6, including:

a pair of indexing pins intermediate the nonmagnetic plates below the cores to be engaged by the lower edge of a card placed between said nonmagnetic plates.

8. The combination of claim 4, wherein said plate of magnetic material is fixed to one and slidably engages the other of said parallel magnetic plates, whereby the assemblies of said parallel magnetic plates, nonmagnetic plates, cores and coils are relatively movable;

and means biasing said assemblies so that said nonmagnetic plates are urged toward face-to-face contact.

9. The combination of claim 8, including:

means to separate said assemblies to permit a card to be inserted between said nonmagnetic plates, said biasing means upon release of said separating means being operative to urge said nonmagnetic plates against the card so as to clamp the card between them.

10. The combination of claim 3, including:

circuit means for connecting said coils to an energizing source;

switch means selectively operable to simultaneously connect all said coils in said circuit means to energize all said coils and establish magnetic fields therethrough in predetermined directions;

a respective switch for each pair of coils, said switches being individually operable to connect the associated coils in said circuit means to establish magnetic fields therethrough in directions opposite to the fields established during operation of said switch means;

and means operable during operation of said switch means to prevent operation of any of said respective switches, and operable during operation of any of said respective switches to prevent operation of said switch means.

11. The combination of claim 10, including:

means in said circuit means to develop relatively high and low levels of electrical energy;

and second switch means operable, upon operation of said first-mentioned switch means to connect all electromagnets to said circuit means, to apply the higher level of energy to said circuit means, said second switch means being operable upon operation of one or more of said switches to apply the lower level of energy to said circuit means.

12. The combination of claim 11, wherein said developing means includes means to supply each level of energy as a pulse.

13. The combination of claim 12, wherein said pulsing means includes;

a capacitor;

a relay having a normally open switch;

means to charge said capacitor;

means to connect said capacitor when charged to said coil to energize it and close said relay switch while said capacitor discharges;

and means operable during the period said relay switch is closed to connect the higher or lower energy levels to said circuit means.

14. The combination of claim 13, wherein said last-named means includes;

a full-wave rectifier having a pair of input terminals, and a pair of output terminals;

a stepdown transformer having primary and secondary windings connected at one end to one input terminal, said second switch means including a single-pole, double-throw switch having a movable contact connected to the other input terminal, one fixed contact connected to the other end of said secondary winding, and the other fixed contact connected to the other end of said primary winding;

a pair of A-C power lines, said other end of said primary winding being connected to one power line said relay switch being adapted to be coupled between said one input terminal and the other power line.

15. The combination of claim 14, including a pair of connections from said output terminals to said first switch means;

and a pair of connections from said output terminals to each of said respective switches.

16. The combination of claim 15, including:

a switch in one of the connections to said respective switches and operable to close said one connection when the movable contact of said single-pole, double-throw switch engages said one fixed contact thereof, and to open when said movable contact engages said other fixed contact.

17. The combination of claim 16, wherein each electromagnet is formed of a pair of coaxial coils with respective cores therethrough, the coils of each pair being connected in series, the confronting ends of the coaxial cores being in close proximity to each other, said switch means including a plurality of single-pole, single-throw switches for connecting groups of pairs of serially connected coils in series, each group being connected in parallel to each of the other groups;

and each respective switch being a double-pole, single-throw switch having two fixed contacts between which the associated serially connected coils are connected, and a pair of movable contacts, each connected to a respective one of the associated pair of connections from said output terminals.

18. The combination of claim 17, wherein said means to charge said capacitor includes a single-pole, double-throw switch having a movable contact and a pair of fixed contacts, one of which is connected to one end of said relay coil, said capacitor being connected between said movable contact and the other end of said relay coil;

and half-wave rectifying means coupled between the other fixed contact of said last-mentioned switch and said other power line.

19. In combination:

a housing;

a plurality of rows of external pushbuttons, each bearing a respective indicium, each pushbutton being mounted on a plunger element extending into said housing, there being a pushbutton in each row bearing the same indicium;

lever means extending to the exterior of said housing;

means in said housing normally biasing each plunger outwardly;

means associated with each row of plungers to releasably lock any one or more of them in an inner position to which they are depressed upon pressing their pushbuttons;

means operable by said lever means to simultaneously operate the releasable locking means of all rows to free the depressed plungers for return to their outer positions by said biasing means;

a pair of assemblies of coils with cores therethrough, the coils and cores in each assembly being the same in number and rows as said pushbuttons, said assemblies being juxtaposed with corresponding cores being coaxial, the coils around each pair of coaxial cores being connected in series;

energize switch means in said housing;

an external lever for operating said switch means;

means operable by said energize switch means when operated by said external lever to energize all pairs of serially connected coils simultaneously;

respective switches in said housing to be operated by the respective plungers when they are depressed by their pushbuttons, each such switch being connected to a respective pair of serially connected coils;

and means operable by said energize switch means when operated by said external lever to energize only those pairs of serially connected coils for which the associated pushbuttons are pressed, the direction of magnetic fields established by coils whose switches are operated by the plungers being opposite to the fields established thereby when all coils are energized simultaneously.

20. The combination of claim 19, wherein one of said assemblies is movable;

means normally biasing the movable assembly to urge the confronting ends of the coaxial cores together;

and means operable by said lever means to separate the movable assembly from the fixed assembly simultaneously with operation of said releasable locking means to free depressed plungers.

21. The combination of claim 19, wherein said energizing means includes a power switch having an on-off control element mounted on said housing;

and a lamp mounted on said housing and adapted to indicate when the power switch is closed.

22. The combination of claim 21, wherein said housing includes a plurality of openings;

and a fan in said housing to circulate air among the coils and through said openings, said fan having a motor in circuit with said power switch.

23. The combiantion of claim 19, including a further external lever having two positions, said further lever in one position permitting only simultaneous energization of all coils;

and said further lever in its other position permitting energization only of those coils for which the associated pushbuttons are pressed.

References Cited

UNITED STATES PATENTS

| | | | |
|---|---|---|---|
| 2,098,596 | 11/1937 | Rust | 179—100.2 |
| 2,359,617 | 10/1944 | Bryce | 346—74 |
| 2,416,090 | 2/1947 | DeForest | 346—74 |
| 2,943,907 | 7/1960 | Dickenson | 346—74 |
| 3,015,087 | 12/1961 | O'Gorman | 340—149 |
| 3,100,834 | 8/1963 | Demer | 235—61.12 |
| 3,154,761 | 10/1964 | O'Gorman | 340—149 |

BERNARD KONICK, Primary Examiner

LEE J. SCHROEDER, Assistant Examiner

U.S. Cl. X.R.

235—61.11, 61.12; 340—174.1